Aug. 20, 1929.  E. BLAU  1,725,330
SURFACE PLATE FOR WHEEL LATHES
Filed Feb. 28, 1928
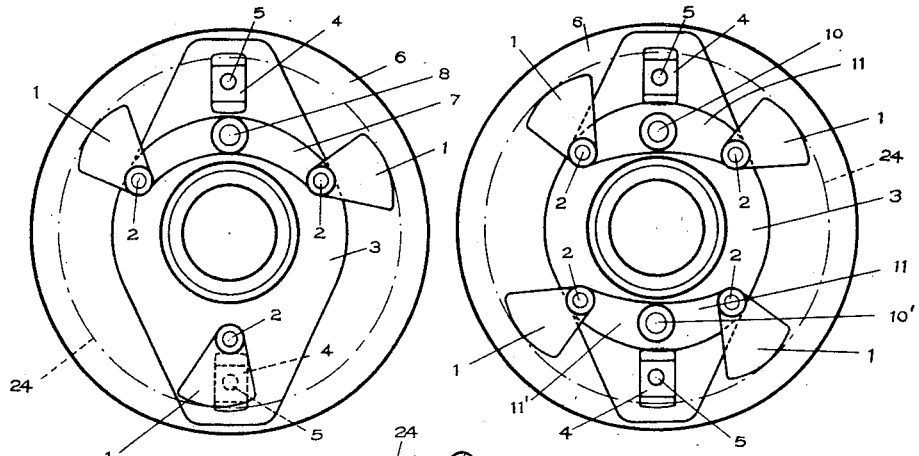
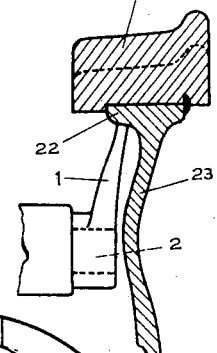
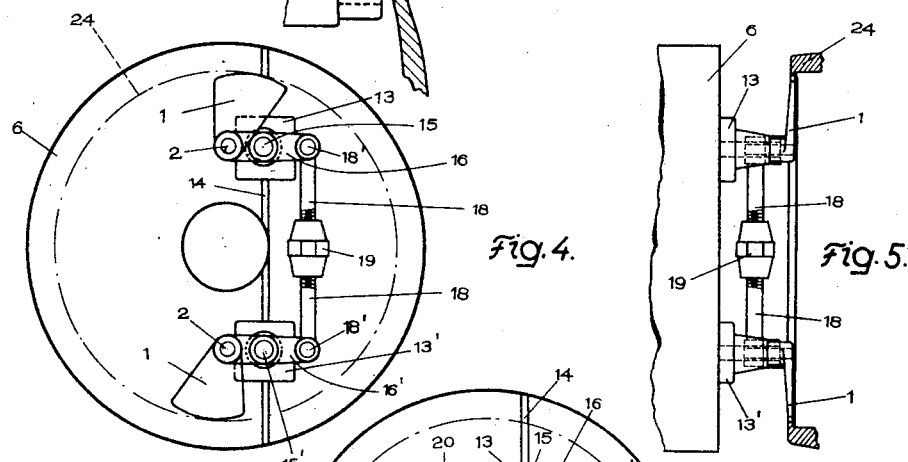
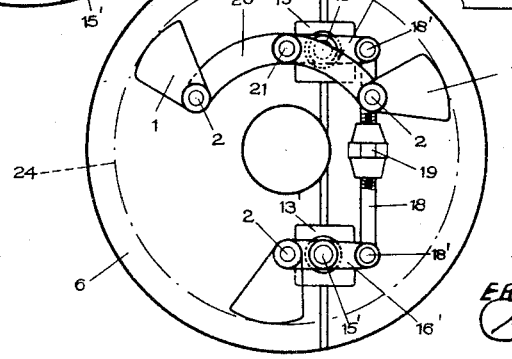
Inventor:
ERNST BLAU Patented Aug. 20, 1929.

1,725,330

UNITED STATES PATENT OFFICE.

ERNST BLAU, OF BERLIN, GERMANY.

SURFACE PLATE FOR WHEEL LATHES.

Application filed February 28, 1928, Serial No. 257,742, and in Germany November 26, 1925.

My invention relates to surface plates for wheel lathes, and particularly to lathes of the type in which jaws are provided for engaging the tire or the rim of the wheels on the inside, instead of drivers engaging between the spokes, or inserted in holes, of the wheel centre.

It is an object of my invention to provide means for equalizing the pressures which the jaws exert on the tire or the rim, as the case may be, and to this end I provide the usual surface plate with a movable support on which the jaws are movably carried, the support effecting uniform distribution of pressures on the jaws when the reaction of the cutting tool causes one of them to become engaged with the work.

It has already been proposed in the case of wheels which are without spokes or holes for the attack of drivers, to provide jaws for engaging the outer end faces of the tires but this involves the drawback that the axial pressure of the jaws is liable to deform the wheels and axles. It has also been proposed to provide jaws pivoted on the face plate for engaging the tire on the inside, but without means for uniform pressure distribution such jaws may cause the tires to become loose on the rims, as, with only one of the jaws engaging the tire the pressure at this point becomes excessive and may cause dangerous deformation of the tire, particularly when the tire is worn so that its section is smaller than normal. Conditions are somewhat improved by applying the jaws to the rim instead of the tire but still local pressure is present and undesirable.

Equalizing of pressures has been attempted by connecting two jaws by arms and a connecting rod in order to move that jaw which has engaged the work to move the other jaw into engaging relation as well but this expedient fails in the case of even slight irregularities as it will then prevent the second jaw from engaging the work at all when the first jaw has engaged it.

These drawbacks are overcome in my invention by providing a movable support for the jaws as described so that they are arranged in "floating" relation with respect to each other and the tire, and able to assume the most favourable positions.

In the accompanying drawing movable supports for the jaws are illustrated diagrammatically by way of example.

Figs. 1 and 2 are elevations of a surface plate having a single movable support with three and four jaws, respectively Fig. 3 is a section of part of a wheel centre showing one jaw engaged with the rim, Figs. 4 and 5 are a front and end elevation, respectively, of a modification of my invention, Fig. 6 is an elevation of still another modification of the invention.

Referring now to Fig. 1, 6 is the surface plate of a wheel lathe, not shown, 3 is a movable support which is carried to slide on the plate, having slots, and blocks 4 secured to the surface plate by pins 5 being inserted in the slots. 2 are pins, and 1 are spiral jaws pivoted on the pins. Two of the jaws have their pins 2, 2 connected by a double-armed lever 7 which is fulcrumed on the support 3 at 8 so that the pins 2, 2 are able to rock bodily about the fulcrum 8. The pin 2 of the third jaw 1 is secured in the support 3.

When the reaction of the cutting tool, not shown, acts on one of the jaws, the support 3 will be so displaced that all jaws engage the inside of the tire 24 which is indicated by a dot- and dash-line, at equal pressure.

Referring now to Fig. 2, the support 3 is designed and carried on the surface plate 6 as described, but in this case four jaws 1 are provided the pivots 2 of each pair of jaws being secured to the ends of double-armed levers 11, 11' which are fulcrumed on the support 3 at 10 and 10', respectively. The pressures on each pair of jaws 1, 1 are equalized.

Referring now to Fig. 3, this illustrates the engagement of one of the jaws 1 with the work, 22 being the rim, 23 the wheel centre, and 24 the tire. A worn tire section is indicated in dotted lines.

Referring now to Figs. 4 and 5, the device contains two blocks 13, which are adapted to be displaced in a slot 14 of the face plate 6 for different diameters of the work pieces to be held, but are, during working, fixed on this plate. 15, 15' are pivots on the blocks 13 and 13', respectively, 16, 16' are double-armed levers on the pivots, 18 is a connecting rod engaging pins 18', 18' at the ends of both levers, and 19 is a threaded sleeve connecting the oppositely threaded ends of the rod so as to vary its effective length. Preferably, the pivots 15, 15' are also made adjustable. The jaws 1, 1 are pivoted to the free ends of the levers 16, 16' at 2.

Referring now to Fig. 6, this construction is similar to the one described with reference to Figs. 4 and 5 but equipped with three jaws 1, two of which are pivoted at 2, 2 to the ends of a double-armed lever 20 which is fulcrumed on the lever 16 at 21.

When the jaws 1 engage the rim 22 as shown in Fig. 3 forces tending to loosen the tire are not exerted at all and this arrangement of the jaws therefore is the most favorable.

It is understood that I am not limited to the particular constructions shown and described, and that details may be modified in various ways without departing from my invention.

I claim:

1. A surface plate for wheel lathes, a supporting means on said plate freely movable in a plane parallel to the face of the plate, and a plurality of eccentric jaws pivotally carried by said supporting means at points diametrically opposed with respect to the center of rotation of said plate whereby a movement of one jaw in the direction of the center of rotation effects relative movement of the remaining jaw or jaws away from the center of rotation.

2. A surface plate for wheel lathes, a support on said plate movable in a plane parallel to the surface of said plate, and a plurality of means on said support for carrying eccentric jaws pivotally with respect to said support, and eccentric jaws carried by said means, said last named means being located at points diametrically opposed with respect to the center of rotation of said plate.

3. A surface plate for wheel lathes, a support on said plate freely slidable in a plane parallel to the face of said plate, and extending on opposite sides of the center of the plate, and eccentric jaws for engaging the inner periphery of a piece of work revolving about a fixed center, said jaws being pivotally carried by said support.

4. A surface plate for wheel lathes, a support on said plate radially freely slidable with respect to said plate and extending on opposite sides of the center of the plate, a second support pivoted on said first named support, eccentric jaws pivoted on said second support, and a jaw for engaging the inner periphery of a piece of work connected to said first named support at a point diametrically opposite to the point at which said second support is pivoted.

5. A surface plate for wheel lathes, a support on said plate radially freely slidable with respect to the plate and extending on opposite sides of the center thereof, secondary supports pivoted on said first named support at diametrically opposed points, and eccentric jaws pivoted on each of said secondary supports.

In testimony whereof, I have signed my name to this specification this 13th day of February, 1928.

ERNST BLAU.